Patented Sept. 19, 1944

2,358,618

UNITED STATES PATENT OFFICE 2,358,618

MANUFACTURE OF KETO-ALCOHOL ACETATES

Franz Bergel, Welwyn Garden City, England, assignor to Roche Products Limited, Welwyn Garden City, Hertfordshire, England No Drawing. Application April 30, 1942, Serial No. 441,133. In Great Britain May 13, 1941

3 Claims. (Cl. 260—488)

This invention relates to the manufacture of keto-alcohol acetates. The preparation of keto-alcohol esters, such as γ-acetopropyl alcohol acetate, is described by A. Lipp (Ber. der deutschen Chem. Ges., 1899, 22, 1205), by a process in which γ-acetopropyl alcohol is treated with acetic anhydride. A simple synthesis of γ-acetopropyl alcohol by hydrolysis and decarboxylation of α-aceto-γ-butyrolactone was described by I. L. Knunjanz et al. (Compt. rend. Acad. Sci. U. S. S. R, 1934, 1, 312).

The present invention provides a process wherein lactones of the general formula:

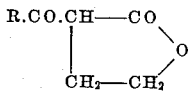

wherein R is an alkyl, aralkyl or aryl group (hereinafter referred to as lactones of the type of α-aceto-γ-butyrolactone) are transformed in one step into the acetate of the corresponding alcohol. It has been found that when lactones of the above type are heated with glacial acetic acid in the presence of anhydrous sodium acetate or sodium acetate containing acetic acid of crystallisation, ring opening, decarboxylation and acetylation all occur at the same time. If the lactones are treated with glacial acetic acid alone, or with a mixture of glacial acetic acid and acetic anhydride, the yield of keto-alcohol acetates is very poor indeed compared with the yield obtained when the reaction is carried out in the presence of sodium acetate.

The following examples illustrate how the process of the invention may be carried into effect:

1. 100 parts by weight of α-aceto-γ-butyrolactone are mixed with 300 parts by weight of glacial acetic acid. 128 parts by weight of anhydrous sodium acetate are added and the mixture, which gradually forms a homogeneous liquid, is refluxed for 18 to 24 hours. The still warm mixture after refluxing is poured into 450 parts by weight of benzene with stirring and after cooling to about 10° C. the sodium acetate with glacial acetic acid of crystallisation is filtered off. The crystals, which are well pressed on the filter, are washed with about 100 parts by weight of benzene and amount after drying over paraffin in vacuo for 1 hour to about 280–300 parts by weight.

The filtered solution, after removal of benzene and glacial acetic acid by evaporation, is subjected to fractional distillation when γ-acetopropyl acetate boils at:

96–99° C./12 mm.
103–104° C./14 mm.
110–112° C./17 mm.

The refractive index of the γ-acetopropyl acetate is $n_D^{20}=1.426$.

Analysis: Found: C=58.8%, H=8.5%. $C_7H_{12}O_3$ requires: C=58.3%, H=8.3%.

2. If instead of anhydrous sodium acetate sodium acetate containing acetic acid of crystallisation obtained in the course of the operations described in Example 1 is used, the following procedure is carried out:

The first step is to determine the content of glacial acetic acid in the sodium acetate, which is usually about 2 mols. (59.4%). Then, for 100 parts by weight of α-aceto-γ-butyrolactone 112.7 parts by weight of glacial acetic acid and 315.3 parts of sodium acetate containing acetic acid of crystallisation are needed if the salt contains 2 mols. of acetic acid. If it contains less than 2 mols. the quantities of salt and glacial acetic acid added are such that the original 128 and 300 parts respectively are present. The process is otherwise carried out as described in Example 1.

3. 2 parts of α-benzoyl-γ-butyrolactone, [prepared from ethyl benzoyl acetate (cf. Beilstein, X, page 674) analogous to the method by I. L. Knunjanz et al. (loc. cit.) for acetobutyrolactone, boiling point about 180° C./2.5 mms. (Analysis: Found: C, 69.0; H, 5.5; $C_{11}H_{10}O_3$ requires: C, 69.5; H, 5.3%.)]. 6 parts of glacial acetic acid and 1.82 parts of anhydrous sodium acetate are mixed and refluxed for 18 hours. The still warm mixture is then poured into 30 parts by volume of benzene, and after cooling to 5–10° C. the sodium acetate with acetic acid of crystallisation is filtered off. The filtrate after removal of benzene and glacial acetic acid is subjected to fractional distillation, when γ-benzoylpropyl acetate distils at 110–118° C., at 16 mms. (Analysis: Found: C, 70.0; H, 6.6; $C_{12}H_{14}O_3$ requires: C, 70.0; H, 6.8%.)

I claim:

1. A process for the manufacture of keto-alcohol acetates which comprises heating lactones of the general formula

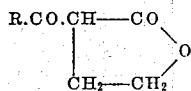

in which R is selected from the group consisting of alkyl, aralkyl and aryl groups with glacial acid in the presence of a substance selected from the group consisting of anhydrous sodium acetate and sodium acetate containing acetic acid of crystallisation.

2. A process for the manufacture of γ-acetopropyl acetate which comprises heating α-aceto-γ-butyrolactone with glacial acid in the presence of a substance selected from the group consisting of anhydrous sodium acetate and sodium acetate containing acetic acid of crystallisation.

3. A process for the manufacture of γ-benzoylpropyl acetate which comprises heating α-benzoyl-γ-butyrolactone with glacial acid in the presence of a substance selected from the group consisting of anhydrous sodium acetate and sodium acetate containing acetic acid of crystallisation.

FRANZ BERGEL.